Aug. 6, 1940.     D. H. WEST     2,210,109
METAL CUTTING TOOL
Filed May 10, 1938
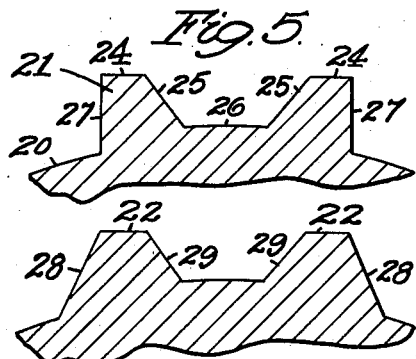
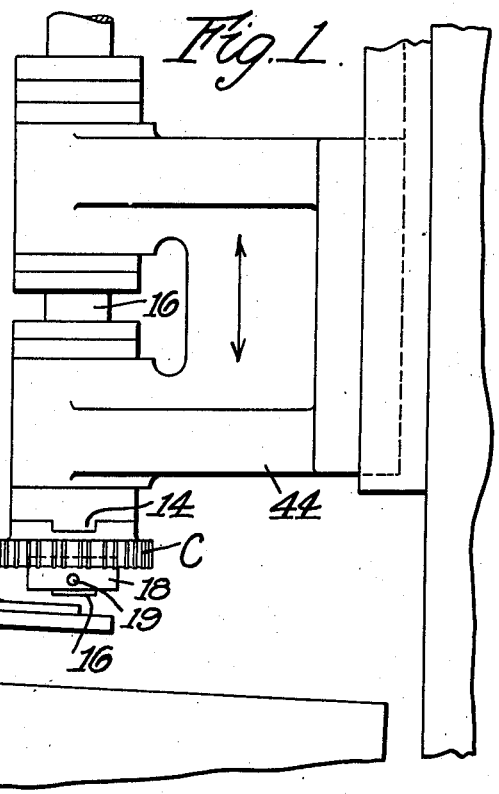
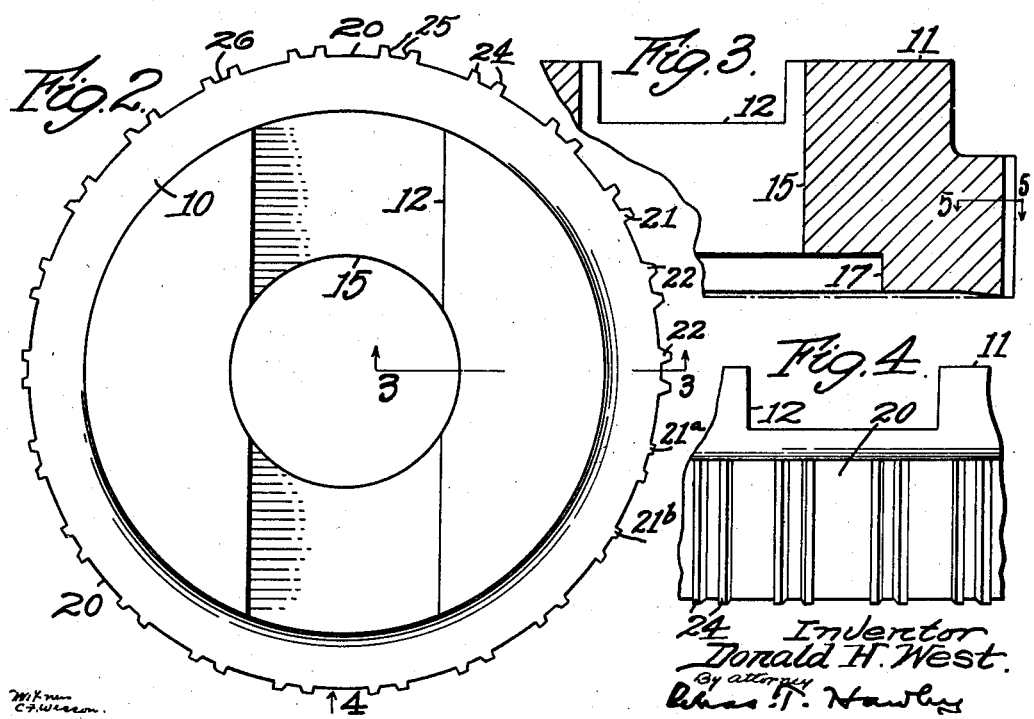
Inventor
Donald H. West
By attorney Patented Aug. 6, 1940

2,210,109

UNITED STATES PATENT OFFICE 2,210,109

METAL CUTTING TOOL

Donald H. West, Detroit, Mich., assignor to The Lapointe Machine Tool Company, Hudson, Mass., a corporation of Maine Application May 10, 1938, Serial No. 207,069

3 Claims. (Cl. 29—95.1)

This invention relates to a metal cutting tool capable of general application but particularly adapted for cutting external splines or parallel-sided ribs lengthwise of surfaces of rotation. My improved cutter is exceptionally useful in cutting longitudinal splines or ribs on machine parts which are frusto-conical in shape.

It is the general object of my invention to provide an improved tool for such purposes, by which extremely accurate work can be produced.

A further object is to provide a tool adapted to make a series of progressive partial cuts of gradually increasing depth, by which splines of substantial thickness may be easily formed in hard or tough metal.

My invention further relates to arrangements and combinations of parts which will be hereinafter described and more particularly pointed out in the appended claims.

A preferred form of the invention is shown in the drawing, in which

Fig. 1 is a side elevation of parts of a machine in which my improved cutting tool may be utilized to advantage;

Fig. 2 is a plan view of the tool;

Fig. 3 is a partial sectional elevation, taken along the line 3—3 in Fig. 2;

Fig. 4 is a partial front elevation, looking in the direction of the arrow 4 in Fig. 3;

Fig. 5 is an enlarged detail sectional view of a cutting element, taken along the line 5—5 in Fig. 3; and Fig. 6 is a similar view of a finishing element.

Referring to the drawing, I will first describe my improved cutting tool and will then explain the use and advantages thereof.

My improved cutting tool C preferably comprises a disc 10 having a thickened hub portion 11 which is recessed at 12 to receive a driving member 14 (Fig. 1) by which the tool may be angularly advanced and accurately located. The hub 11 is also provided with a cylindrical axial opening 15 to receive a supporting shaft 16 and with an enlarged circular recess 17 to receive the end of a locking collar 18 (Fig. 1), which may be secured on the shaft 16 by a pin 19 or in any other convenient manner. The shaft 16 does not rotate but is intermittently advanced.

The details thus far described are relatively unimportant, it being sufficient that the disc 10 be provided with means by which it may be accurately located and held from angular displacement on a supporting shaft, as 16.

The peripheral surface 20 of the disc 10 is substantially cylindrical, except for the provision of a circumferential series of unitary cutting elements 21 and unitary finishing elements 22, which series extends in uniformly spaced relation around the entire periphery of the disc 10. The cutting elements 21 are all substantially similar except in height, and each element 21 comprises side cutting portions 24 (Fig. 5) separated by a recessed middle portion having inclined side surfaces 25 and a bottom surface 26. The portions 24 and 25 have or may have cutting edges.

Throughout the series of cutting elements 21, the surfaces 26 are uniformly positioned at equal radial distances from the axial center of the tool but the side portions 24 gradually and progressively increase in height beyond the peripheral surface 20. The increase in height from one pair of cutting elements to the next will vary according to the size of the tool and the nature of the material to be cut, but in a typical cutting tool the increase will commonly be between .003" and .004".

The external side surfaces 27 (Fig. 5) of the cutting elements 21 are preferably straight and parallel to the middle radius of the cutting element. The finishing elements 22 are like the highest cutting elements 21, except that the outer side portions 28 are inclined as shown in Fig. 6, and that the inner side portions 29 are very slightly nearer together than the side portions 25 (Fig. 5) of the elements 21.

My improved cutting tool may conveniently be formed by making all of the cutting elements 21 of the same size and shape as the finishing elements 22, and by thereafter grinding away portions of progressively increasing thickness from the outer edge portions of successive cutting elements until the desired progressive difference in height of cutting elements is attained. The outer side portions are also ground to the parallel relation shown in Fig. 5.

Having described the details of construction of my improved cutter, the use and advantages thereof will be apparent by reference to Fig. 1, which shows how a piece of work W mounted on a rotatable inclined work support 40 may have its slightly tapered hub portion 41 provided with a series of spaced external splines which are of uniform cross section throughout their length.

My improved cutting tool C is shown as mounted on the shaft 16 previously described, and the shaft 16 is supported in a bearing block or slide 44 which may be vertically reciprocated. Any suitable means may be provided for intermittently moving the work W and the tool C angularly and by predetermined amounts.

In the ordinary operation of the machine, the work W is advanced toward the tool C to a predetermined working position, in which position the first unitary cutting element 21ª of the external series will engage the hub 41 and when reciprocated relative thereto will make two shallow parallel cuts therein. It is to be understood that the work is mounted in such a position that the exterior conical surface thereof will be parallel to the path of travel of the tool C at the point of operation.

In the usual procedure, the cutter C is moved downward to make a cut with the cutting element 21ª, after which the work is withdrawn, the cutter is moved upward, the work is indexed and again advanced to the cutting position, and a second cut is made by the element 21ª. This procedure is followed until a series of shallow cuts have been made entirely around the hub portion 41, whereupon the cutter C is advanced one space to bring the cutting element 21ᵇ into working position, and a second series of cuts is then made around the hub 41, slightly deepening but not widening the previous cuts. Similar operations are thereafter repeated until the last and deepest cutting element 21 in the series is brought into working position and makes its series of cuts around the hub 41, thus roughly completing the desired series of external splines or parallel-sided ribs 42. The two finishing elements 22 are then brought successively to working position. These finishing elements commonly cut only on the inclined inner portions and accurately size the splines or ribs on the two sides thereof.

The work is then removed, a new piece of work is inserted, the cutter is indexed to initial position, and cutting operations are resumed.

The overall width of the cutting elements 21 is such that the cuts formed thereby slightly overlap on the hub 41 and thereby remove all of the stock between the finished ribs 42, with substantially equal cuts at each side of the spline being formed. The finishing elements 22 are beveled outwardly to brace the cutting portions thereof against side pressure in making the finishing cuts on the sides of the splines. The bottom portions 26 of the cutting elements 21 and the outer end portions of the finishing elements 22 commonly do no cutting.

By use of my improved cutting tool as above described, I am able to form a series of splines on a tapered hub with very great accuracy, so that they are well adapted to fit corresponding internal grooves cut in a conical recess in an associated piece, these grooves being commonly cut by an ordinary single tooth tool and having the same cross section throughout their length.

Having thus described my invention and the advantages thereof, I do not wish to be limited to the details herein disclosed, otherwise than as set forth in the claims, but what I claim is:

1. A metal broaching tool for cutting external splines of uniform width on a conical piece of work of circular cross section which comprises a disc having a concentric and substantially cylindrical periphery and having a plurality of unitary cutting elements mounted on said periphery and uniformly spaced apart angularly by non-cutting portions of said cylindrical periphery, the cutting parts of successive cutting elements projecting progressively greater distances from said periphery and each unitary cutting element comprising spaced end-cutting edge portions, a normally non-cutting middle bottom portion and end cutting connecting portions, and all of said cutting portions of a unitary cutting element simultaneously engaging the work and simultaneously operating thereon to produce a single external spline of uniform width extending longitudinally of said conical piece of work.

2. A metal broaching tool for cutting external splines of uniform width on a conical piece of work of circular cross section which comprises a disc having a concentric and substantially cylindrical periphery and having a plurality of unitary cutting elements mounted on said periphery and uniformly spaced apart angularly by non-cutting portions of said cylindrical periphery, the cutting parts of successive cutting elements projecting progressively greater distances from said periphery and each unitary cutting element comprising spaced end-cutting edge portions, a normally non-cutting middle bottom portion and oppositely inclined end-cutting connecting portions, the end and bottom portions being substantially parallel to and concentric with the periphery of said disc and the bottom portions of all cutting elements being at the same radial distance from the axis of said disc, and all of said cutting portions of a unitary cutting element simultaneously engaging the work and simultaneously operating thereon to produce a single external spline of uniform width extending longitudinally of said conical piece of work.

3. The combination in a cutting tool as set forth in claim 2, in which additional similar unitary finishing elements are provided on said periphery, said finishing elements having inclined inner cutting edges slightly closer together than in the first-mentioned elements and effective to accurately size said splines widthwise.

DONALD H. WEST.